United States Patent
Kleyer et al.

(10) Patent No.: US 6,361,716 B1
(45) Date of Patent: Mar. 26, 2002

(54) SILICONE COMPOSITION AND ELECTRICALLY CONDUCTIVE SILICONE ADHESIVE FORMED THEREFROM

(75) Inventors: Don Lee Kleyer, Hemlock; Michael Andrew Lutz, Hope, both of MI (US)

(73) Assignee: Dow Corning Corporation, Midland, MI (US)

(*) Notice: Subject to any disclaimer, the term of this patent is extended or adjusted under 35 U.S.C. 154(b) by 0 days.

(21) Appl. No.: 09/620,179

(22) Filed: Jul. 20, 2000

(51) Int. Cl.[7] .............................. C08K 3/02; C08K 5/05
(52) U.S. Cl. ................... 252/514; 524/398; 524/261; 524/266; 524/267; 524/588; 525/479; 528/15; 528/31; 528/32
(58) Field of Search .............................. 528/15, 31, 32; 524/398, 268, 267, 261, 588; 252/514

(56) References Cited

U.S. PATENT DOCUMENTS

| | | | |
|---|---|---|---|
| 4,054,714 A | 10/1977 | Mastrangelo | 428/328 |
| 4,303,572 A | 12/1981 | Hatanaka et al. | 260/37 SB |
| 5,075,038 A | 12/1991 | Cole et al. | 252/514 |
| 5,227,093 A | 7/1993 | Cole et al. | 252/512 |
| 5,384,075 A | 1/1995 | Okami | 252/511 |
| 5,498,644 A | 3/1996 | Reo | 523/218 |
| 5,932,145 A | 8/1999 | Mitani et al. | 252/511 |
| 6,010,646 A * | 1/2000 | Schleifstein | |
| 6,017,587 A | 1/2000 | Kleyer et al. | 427/387 |

FOREIGN PATENT DOCUMENTS

| | | | |
|---|---|---|---|
| EP | 0 545 568 A1 | 6/1993 | H01B/1/22 |
| EP | 0653463 A2 | 11/1994 | C08L/83/07 |
| EP | 0 647 682 A1 | 4/1995 | C08L/83/07 |
| EP | 839870 A2 * | 10/1997 | |
| JP | 03-128968 * | 5/1991 | |

* cited by examiner

Primary Examiner—Robert Dawson
Assistant Examiner—Marc S. Zimmer
(74) Attorney, Agent, or Firm—Larry A. Milco; Catherine Brown

(57) ABSTRACT

A curable silicone composition for preparing a silicone adhesive, the composition comprising (A) an organopolysiloxane containing an average of at least two silicon-bonded alkenyl groups per molecule; (B) an organohydrogenpolysiloxane containing an average of at least two silicon-bonded hydrogen atoms per molecule in a concentration sufficient to cure the composition; (C) an electrically conductive filler in an amount sufficient to impart electrical conductivity to the silicone adhesive, wherein the filler comprises particles having at least an outer surface of a metal selected from silver, gold, platinum, palladium, and alloys thereof; (D) an effective amount of a hydroxy-functional organic compound having a molecular weight up to about 1000 and containing at least one hydroxy group per molecule, provided the compound is free of acetylenic hydroxy groups and the compound does not substantially inhibit cure of the composition; and (E) a catalytic amount of a hydrosilylation catalyst. A silicone adhesive and a multi-part curable silicone composition.

23 Claims, No Drawings

… (US 6,361,716 B1)

SILICONE COMPOSITION AND ELECTRICALLY CONDUCTIVE SILICONE ADHESIVE FORMED THEREFROM

FIELD OF THE INVENTION

The present invention relates to a curable silicone composition for preparing a silicone adhesive and more particularly to an addition-curable silicone composition containing an electrically conductive filler and a hydroxy-functional organic compound. The present invention also relates to an electrically conductive silicone adhesive produced from such composition.

BACKGROUND OF THE INVENTION

Silicone adhesives are useful in a variety of applications by virtue of their unique combination of properties, including high thermal stability, good moisture resistance, excellent flexibility, high ionic purity, low alpha particle emissions, and good adhesion to various substrates. For example, silicone adhesives are widely used in the automotive, electronic, construction, appliance, and aerospace industries.

Addition-curable silicone compositions comprising an alkenyl-containing polydiorganosiloxane, an organohydrogenpolysiloxane, an electrically conductive filler, and a hydrosilylation catalyst are known in the art. Illustrative of such compositions are U.S. Pat. No. 5,075,038 to Cole et al.; U.S. Pat. No. 5,227,093 to Cole et al.; European Patent Application No. 0 653 463 to Mine et al.; U.S. Pat. No. 5,384,075 to Okami; U.S. Pat. No. 5,932,145 to Mitani et al.; U.S. Pat. No. 5,498,644 to Reo; and U.S. Pat. No. 6,017,587 to Kleyer et al. However, none of the aforementioned references teach the hydroxy-functional organic compound of the present invention.

SUMMARY OF THE INVENTION

The present inventors have discovered that an addition-curable silicone composition containing an electrically conductive filler and a hydroxy-functional organic compound cures to form an adhesive having unexpectedly superior electrical conductivity. Specifically, the present invention is directed to a curable silicone composition for preparing a silicone adhesive, the composition comprising:

(A) an organopolysiloxane containing an average of at least two silicon-bonded alkenyl groups per molecule;

(B) an organohydrogenpolysiloxane containing an average of at least two silicon-bonded hydrogen atoms per molecule in a concentration sufficient to cure the composition;

(C) an electrically conductive filler in an amount sufficient to impart electrical conductivity to the silicone adhesive, wherein the filler comprises particles having at least an outer surface of a metal selected from silver, gold, platinum, palladium, and alloys thereof;

(D) an effective amount of a hydroxy-functional organic compound having a molecular weight up to about 1000 and containing at least one hydroxy group per molecule, provided the compound is free of acetylenic hydroxy groups and the compound does not substantially inhibit cure of the composition; and (E) a catalytic amount of a hydrosilylation catalyst.

The present invention is also directed to a silicone adhesive comprising a reaction product of the above-described composition.

The present invention is further directed to a multi-part curable silicone composition comprising components (A) through (E) in two or more parts, provided components (A) (B), and (E) are not present in the same part.

The silicone composition of the present invention has numerous advantages, including good flow, low VOC (volatile organic compound) content, and adjustable cure. Moreover, the present silicone composition cures to form a silicone adhesive having good adhesion and unexpectedly superior electrical conductivity as evidenced by a low contact resistance.

The silicone composition of the present invention is useful for preparing an electrically conductive silicone adhesive. The silicone adhesive of the present invention has numerous uses, including die attach adhesives, solder replacements, and electrically conductive coatings and gaskets. In particular, the silicone adhesive is useful for bonding electronic components to flexible or rigid substrates.

These and other features, aspects, and advantages of the present invention will become better understood with reference to the following description and appended claims.

DETAILED DESCRIPTION OF THE INVENTION

The present invention is directed to a curable silicone composition for preparing a silicone adhesive, the composition comprising:

(A) an organopolysiloxane containing an average of at least two silicon-bonded alkenyl groups per molecule;

(B) an organohydrogenpolysiloxane containing an average of at least two silicon-bonded hydrogen atoms per molecule in a concentration sufficient to cure the composition;

(C) an electrically conductive filler in an amount sufficient to impart electrical conductivity to the silicone adhesive, wherein the filler comprises particles having at least an outer surface of a metal selected from silver, gold, platinum, palladium, and alloys thereof;

(D) an effective amount of a hydroxy-functional organic compound having a molecular weight up to about 1000 and containing at least one hydroxy group per molecule, provided the compound is free of acetylenic hydroxy groups and the compound does not substantially inhibit cure of the composition; and (E) a catalytic amount of a hydrosilylation catalyst.

Component (A) of the present invention, also referred to herein as the "polymer," is at least one organopolysiloxane containing an average of at least two silicon-bonded alkenyl groups per molecule. The structure of the organopolysiloxane can be linear, branched, or resinous. The organopolysiloxane can be a homopolymer or a copolymer. The alkenyl groups typically have from 2 to about 10 carbon atoms and are exemplified by, but not limited to, vinyl, allyl, butenyl, and hexenyl. The alkenyl groups in the organopolysiloxane may be located at terminal, pendant, or both terminal and pendant positions. The remaining silicon-bonded organic groups in the organopolysiloxane are independently selected from monovalent hydrocarbon and monovalent halogenated hydrocarbon groups free of aliphatic unsaturation. These monovalent groups typically have from 1 to about 20 carbon atoms, preferably from 1 to 10 carbon atoms, and are exemplified by, but not limited to, alkyl such as methyl, ethyl, propyl, pentyl, octyl, undecyl, and octadecyl; cycloalkyl such as cyclohexyl; aryl such as phenyl, tolyl, xylyl, benzyl, and 2-phenylethyl; and halogenated hydrocarbon groups such as 3,3,3-trifluoropropyl, 3-chloropropyl, and dichlorophenyl. Preferably, at least 50 percent, and more preferably at least 80%, of the organic groups free of aliphatic unsaturation in the organopolysiloxane are methyl.

The viscosity of the organopolysiloxane at 25° C., which varies with molecular weight and structure, is typically from 0.05 to 200 Pa·s, preferably from 0.5 to 100 Pa·s, and more preferably from 2 to 50 Pa·s.

A preferred organopolysiloxane according to the present invention is a polydiorganosiloxane having the formula $R^2R^1_2SiO(R^1_2SiO)_aSiR^1_2R^2$ wherein each $R^1$ is independently selected from monovalent hydrocarbon and monovalent halogenated hydrocarbon groups free of aliphatic unsaturation, as defined above; $R^2$ is alkenyl, as defined above; and subscript a has a value such that the viscosity of the polydiorganosiloxane at 25° C. is from 0.05 to about 200 Pa·s. Preferably, $R^1$ is methyl and $R^2$ is vinyl.

Examples of organopolysiloxanes useful in the present invention include, but are not limited to, polydiorganosiloxanes having the following formulae:

$ViMe_2SiO(Me_2SiO)_aSiMe_2Vi$,
$ViMe_2SiO(Me_2SiO)_{0.25a}(MePhSiO)_{0.75a}SiMe_2Vi$, $ViMe_2SiO(Me_2SiO)_{0.95a}(Ph_2SiO)_{0.05a}SiMe_2Vi$, $ViMe_2SiO(Me_2SiO)_{0.98a}(MeViSiO)_{0.02a}SiMe_2Vi$, $Me_3SiO(Me_2SiO)_{0.95a}(MeViSiO)_{0.05a}SiMe_3$, and
$PhMeViSiO(Me_2SiO)_aSiPhMeVi$, where Me, Vi, and Ph denote methyl, vinyl, and phenyl respectively and a is as defined above.

Component (A) can be a single organopolysiloxane or a mixture comprising two or more organopolysiloxanes that differ in at least one of the following properties: structure, viscosity, average molecular weight, siloxane units, and sequence.

Methods of preparing organopolysiloxanes suitable for use in the composition of the present invention, such as hydrolysis and condensation of the corresponding organohalosilanes or equilibration of cyclic polydiorganosiloxanes, are well known in the art.

Component (B) of the present invention, also referred to herein as the "crosslinking agent," is at least one organohydrogenpolysiloxane containing an average of at least two silicon-bonded hydrogen atoms per molecule and an average of no more than one silicon-bonded hydrogen atom per silicon atom. Of course, it is generally understood that crosslinking occurs when the sum of the average number of alkenyl groups per molecule in component (A) and the average number of silicon-bonded hydrogen atoms per molecule in component (B) is greater than four. The silicon-bonded hydrogen atoms in the organohydrogenpolysiloxane can be located at terminal, pendant, or at both terminal and pendant positions.

The organohydrogenpolysiloxane can be a homopolymer or a copolymer. The structure of the organohydrogenpolysiloxane can be linear, branched, or cyclic. Examples of siloxane units that may be present in the organohydrogenpolysiloxane include, but are not limited to, $HR^3_2SiO_{1/2}$, $R^3_3SiO_{1/2}$, $HR^3SiO_{2/2}$, $R^3_2SiO_{2/2}$, $R^3SiO_{3/2}$, and $SiO_{4/2}$ units. In the preceding formulae each $R^3$ is independently selected from monovalent hydrocarbon and monovalent halogenated hydrocarbon groups free of aliphatic unsaturation, as defined and exemplified above for component (A). Preferably, at least 50 percent of the organic groups in the organohydrogenpolysiloxane are methyl.

Component (B) can be a single organohydrogenpolysiloxane or a mixture comprising two or more organohydrogenpolysiloxanes that differ in at least one of the following properties: structure, average molecular weight, viscosity, siloxane units, and sequence.

The concentration of component (B) in the silicone composition of the present invention is sufficient to cure (crosslink) the composition. The exact amount of component (B) depends on the desired extent of cure, which generally increases as the ratio of the number of moles of silicon-bonded hydrogen atoms in component (B) to the number of moles of alkenyl groups in component (A) increases. Typically, the concentration of component (B) is sufficient to provide from 0.5 to 5.0 silicon-bonded hydrogen atoms per alkenyl group in component (A). Preferably, the concentration of component (B) is sufficient to provide from 1.0 to 2.0 silicon-bonded hydrogen atoms per alkenyl group in component (A).

Methods of preparing organohydrogenpolysiloxanes suitable for use in the composition of the present invention, such as hydrolysis and condensation of the appropriate organohalosilanes, are well known in the art.

To ensure compatibility of components (A) and (B), the predominant organic group in each component is preferably the same. Preferably this group is methyl.

Component (C) of the present invention is at least one electrically conductive filler comprising particles having at least an outer surface of a metal selected from silver, gold, platinum, palladium, and alloys thereof. Fillers comprising particles consisting of silver, gold, platinum, palladium, and alloys thereof typically have the form of a powder or flakes with an average particle size of from 0.5 to 20 μm. Fillers comprising particles having only an outer surface consisting of silver, gold, platinum, palladium, and alloys thereof typically have an average particle size of from 15 to 100 μm. The core of such particles can be any material, electrical conductor or insulator, that supports a surface consisting of the aforementioned metal and does not adversely affect the electrical properties of the silicone adhesive. Examples of such materials include, but are not limited to, copper, solid glass, hollow glass, mica, nickel, and ceramic fiber.

In the case of electrically conductive fillers comprising metal particles having the form of flakes, the surface of the particles may be coated with a lubricant, such as a fatty acid or fatty acid ester. Such lubricants are typically introduced during the milling process used to produce flakes from a metal powder to prevent the powder from cold welding or forming large aggregates. Even when the flakes are washed with a solvent after milling, some lubricant may remain chemisorbed on the surface of the metal.

The electrically conductive filler of the present invention also includes fillers prepared by treating the surfaces of the aforementioned particles with at least one organosilicon compound. Suitable organosilicon compounds include those typically used to treat silica fillers, such as organochlorosilanes, organosiloxane, organodisilazanes, and organoalkoxysilanes.

Component (C) can be a single electrically conductive filler as described above or a mixture of two or more such fillers that differ in at least one of the following properties: composition, surface area, surface treatment, particle size, and particle shape.

Preferably, the electrically conductive filler of the present invention comprises particles consisting of silver and more preferably particles consisting of silver having the form of flakes.

The concentration of component (C) in the silicone composition of the present invention is sufficient to impart electrical conductivity to the adhesive formed by curing the composition. Typically, the concentration of component (C) is such that the silicone adhesive has a contact resistance less than about 0.5 Ω, as determined using the method in the Examples below. The exact concentration of component (C) depends on the desired electrical properties, surface area of the filler, density of the filler, shape of the filler particles, surface treatment of the filler, and nature of the other components in the silicone composition. The concentration of component (C) is typically from about 15 to about 80 percent by volume and preferably from about 20 to about 50 percent by volume, based on the total volume of the silicone composition. When the concentration of component (C) is less than about 15 percent by volume, the silicone adhesive does not have significant electrical conductivity. When the concentration of component (C) is greater than about 80 percent by volume, the silicone adhesive does not exhibit further substantial improvement in electrical conductivity.

Methods of preparing electrically conductive fillers suitable for use in the silicone composition of the present invention are well known in the art; many of these fillers are commercially available. For example, powders of silver, gold, platinum, or palladium, or alloys thereof are typically produced by chemical precipitation, electrolytic deposition, or cementation. Also, flakes of the aforementioned metals are typically produced by grinding or milling the metal powder in the presence of a lubricant, such as a fatty acid or fatty acid ester. Particles having only an outer surface of at least one of the aforementioned metals are typically produced by metallizing an appropriate core material using a method such as electrolytic deposition, electroless deposition, or vacuum deposition.

As stated above, the electrically conductive filler of the present invention can be a filler prepared by treating the surfaces of the aforementioned particles with at least one organosilicon compound. In this case, the particles can be treated prior to admixture with the other ingredients of the silicone composition or the particles can be treated in situ during the preparation of the silicone composition.

Component (D) of the present invention is at least one hydroxy-functional organic compound having a molecular weight up to about 1000 and containing at least one hydroxy group per molecule, provided the compound is free of acetylenic hydroxy groups and the compound does not substantially inhibit cure of the composition. When the molecular weight of the hydroxy-functional organic compound is greater than about 1000, the silicone adhesive formed by curing the composition does not have substantially improved electrical conductivity relative to an adhesive formed by curing a similar silicone composition lacking only the hydroxy-functional organic compound. As used herein, the term "acetylenic hydroxy groups" refers to hydroxy groups attached to carbon atoms adjacent to carbon-carbon triple bonds. Also, as used herein, the term "substantially inhibit cure" means to prevent cure or retard cure to the point where the cure rate is impracticably slow, for example, several hours or days, at all temperatures from room temperature to about 200° C. Preferably, the silicone composition of the present invention cures in less than about 2 hours at 150° C.

The structure of the hydroxy-functional organic compound can be linear, branched, or cyclic. The hydroxy group(s) in the hydroxy-functional organic compound may be attached to a primary, secondary or tertiary aliphatic carbon atom; an aromatic carbon atom; or a doubly bonded carbon atom in the molecule. Furthermore, there are no restrictions on the stereochemistry of the hydroxy-bearing carbon atom(s) or the molecule.

The hydroxy-functional organic compound can contain one or more functional groups other than hydroxy, provided the compound does not substantially inhibit cure of the composition. Examples of suitable functional groups include, but are not limited to, —O—, >C=O, —CHO, —CO$_2$—, —C≡N, —NO$_2$, >C=C<, —C≡C—, —F, —Cl, —Br, and —I. However, hydroxy-functional compounds containing functional groups that strongly complex the hydrosilylation catalyst, such as —SH, —NH$_2$, —S—, —SO—, —SO$_2$—, —OC(=O)N—, ≡P, ≡P(=O), and =P(=O)OH, may substantially inhibit cure of the composition. The degree of inhibition depends on the mole ratio of the particular functional group to platinum group metal in the hydrosilylation catalyst. The suitability of a particular hydroxy-functional organic compound for use in the silicone composition of the present invention can be readily determined by routine experimentation using the methods in the Examples below.

The hydroxy-functional organic compound can be a naturally occurring or synthetic compound having a liquid or solid state at room temperature. Also, the hydroxy-functional organic compound can be soluble, partially soluble, or insoluble in the silicone composition. The normal boiling point of the hydroxy-functional organic compound, which depends on the molecular weight, structure, and number and nature of functional groups in the compound, can vary over a wide range. Preferably, the hydroxy-functional organic compound has a normal boiling point greater than the cure temperature of the composition. Otherwise, appreciable amounts of the hydroxy-functional organic compound may be removed by volatilization during cure, resulting in little or no improvement in the conductivity of the silicone adhesive. Also, excessive volatilization of the hydroxy-functional organic compound during curing may cause formation of voids in the silicone adhesive.

Examples of hydroxy-functional compounds suitable for use in the composition of the present invention include, but are not limited to, monohydric alcohols such as methanol, ethanol, propanol, butanol, pentanol, hexanol, cyclohexanol, heptanol, nonanol, decanol, undecanol, 1-phenylethanol, benzyl alcohol, allyl alcohol, 3-nitrobenzyl alcohol, 3-chlorobenzyl alcohol, 3-bromobenzyl alcohol, 3-iodobenzyl alcohol, and diethylene glycol butyl ether; dihydric alcohols such as ethylene glycol, propylene glycol (1,2-propanediol), polyethylene glycol, polypropylene glycol, polytetrahydrofuran, benzopinacole, 1,2-butanediol, 1,3-butanediol, 1,4-butanediol, trimethylene glycol (1,3-propanediol), 1,5-pentanediol, and 1,6-hexanediol, and bis (2-hydroxyethyl) ether; polyhydric alcohols such as glycerol, pentaerythritol, dipentaerythritiol, tripentaerythritol, trimethylolethane, trimethylolpropane, ditrimethylolpropane, 1,3-dihydroxyacetone dimer, sorbitol, and mannitol; phenols such as phenol, 1-hydroxynaphthalene, 1,2-dihydroxynaphthalene, hydroquinone, catechol, resorcinol, phloroglucinol (1,3,5-trihydroxybenzene), p-cresol, vitamin E, 2-nitrophenol, 2,4-dinitrophenol, picric acid (2,4,6-trinitrophenol), 4-chlorophenol, 2-bromophenol, 2-iodophenol, 2,4,5-tricholorophenol, chlorohydroquinone, pentachlorophenol; sugars such as glucose, mannose, allose, altrose, idose, gulose, galactose, talose, ribose, arabinose, xylose, lyxose, erythrose, threose, glyceraldehyde, fructose, ribulose, lactose, maltose, and sucrose; hydroxy aldehydes such as 2-hydroxybutyraldehyde, 4-hydroxybenzaldehyde, and 2,4-dihydroxybenzaldehyde; hydroxy ketones such as hydroxyacetone, 1-hydroxy-2 -butanone, 2',4'-dihydroxyacetophenone, benzoin, and 3-hydroxy-2-butanone; hydroxy acids such as citric acid, gluconic acid, 3-hydroxybutyric acid, 2-hydroxycinnamic acid, and salicylic acid (2-hydroxybenzoic acid); and hydroxy esters such as ascorbic acid, TWEEN 20 (polyoxyethylene (20) sorbitan monolaurate), methyl salicylate, methyl 3-hydroxybenzoate, and methyl 2-hydroxyisobutyrate.

Component (D) is present in an effective amount in the silicone composition of the present invention. As used herein, the term "effective amount" means that the concentration of component (D) is such that the silicone composition cures to form a silicone adhesive having improved electrical conductivity, initial contact resistance, compared with a similar silicone composition lacking only the hydroxy-functional organic compound. Typically, the concentration of component (D) is such that the adhesive exhibits at least about a five-fold improvement in contact resistance, as determined using the methods in the Examples below. The concentration of component (D) is typically from about 0.1 to about 3 percent by weight and preferably from about 0.5 to about 1.5 percent by weight, based on the total weight of the composition. When the concentration of component (D) is less than about 0.1 percent by weight, the silicone adhesive typically does not exhibit improved electrical conductivity. When the concentration of component (D) is greater than about 3 percent by weight, excessive evolution of hydrogen gas typically occurs curing due to reaction of the silicon-bonded hydrogen atoms in the organohydrogenpolysiloxane and hydroxy groups in the hydroxy-functional organic compound in the presence of the hydrosilylation catalyst. The evolution of hydrogen can cause the formation of voids in the adhesive. The effective amount of component (D) can be determined by routine experimentation using the methods in the Examples below.

Methods of preparing hydroxy-functional organic compounds suitable for use in the silicone composition of the present invention are well known in the art; many of these compounds are commercially available.

Component (E) of the present invention is a hydrosilylation catalyst that promotes the addition reaction of component (A) with component (B). The hydrosilylation catalyst can be any of the well known hydrosilylation catalysts comprising a platinum group metal, a compound containing a platinum group metal, or a microencapsulated platinum group metal-containing catalyst. Platinum group metals include platinum, rhodium, ruthenium, palladium, osmium and iridium. Preferably, the platinum group metal is platinum, based on its high activity in hydrosilylation reactions.

Preferred hydrosilylation catalysts include the complexes of chloroplatinic acid and certain vinyl-containing organosiloxanes disclosed by Willing in U.S. Pat. No. 3,419,593, which is hereby incorporated by reference. A preferred catalyst of this type is the reaction product of chloroplatinic acid and 1,3-diethenyl-1,1,3,3-tetramethyldisiloxane.

A particularly preferred hydrosilylation catalyst is a microencapsulated platinum group metal-containing catalyst comprising a platinum group metal encapsulated in a thermoplastic resin. Compositions containing microencapsulated hydrosilylation catalysts are stable for extended periods of time, typically several months or longer, under ambient conditions, yet cure relatively rapidly at temperatures above the melting or softening point of the thermoplastic resin(s).

The thermoplastic resin can be any resin that is insoluble in and impervious to the platinum group metal-containing catalyst, and also is insoluble in the silicone composition. The thermoplastic resin typically has a softening point of from about 40 to about 250° C.

As used hereinabove, the terms "insoluble" and "impervious" mean that the amount of the thermoplastic resin that dissolves in the catalyst and/or silicone composition and the amount of catalyst that diffuses through the thermoplastic resin encapsulant during storage are insufficient to cause curing of the composition.

Examples of suitable thermoplastic resins include, but are not limited to, vinyl polymers, such as polyethylene, polystyrene, polyvinyl chloride, polyvinylidene chloride, and copolymers of vinyl chloride and vinylidene chloride; polyacrylates, such as polymethacrylate; cellulose derivatives, such as cellulose ethers, esters, and ether-ester; polyamides; polyesters; silicone resins, and polysilanes. Silicone resins are preferred thermoplastic resins according to the present invention.

Preferred catalysts for the preparation of microencapsulated hydrosilylation catalysts are platinum catalysts, such as chloroplatinic acid, alcohol-modified chloroplatinic acid, platinum/olefin complexes, platinum/ketone complexes, and platinum/vinylsiloxane complexes.

The average particle size of the microencapsulated catalyst is typically from about 1 to about 500 $\mu$m and preferably is from about 1 to about 100 $\mu$m. The microencapsulated catalyst typically contains at least 0.01 percent by weight of the platinum group metal-containing catalyst.

Methods of preparing microencapsulated hydrosilylation catalysts are well known in the art. Examples of such methods include, but are not limited to, chemical methods such as interfacial polymerization and in situ polymerization; physico-chemical methods, such as coacervation and emulsion/suspension hardening; and physical-mechanical methods, such as spray drying.

Microencapsulated hydrosilylation catalysts and methods of preparing them are further described in U.S. Pat. No. 4,766,176 and the references cited therein; and U.S. Pat. No. 5,017,654. The relevant portions of these patents are hereby incorporated by reference to teach microencapsulated catalysts and methods of preparing microencapsulated catalysts suitable for use in the present invention.

The concentration of component (E) is sufficient to catalyze the addition reaction of components (A) and (B). When the composition further comprises an alkenyl-containing organopolysiloxane resin, described below, the concentration of component (E) is sufficient to catalyze the addition reaction of component (A) and the resin with component (B). Typically, the concentration of component (E) is sufficient to provide from 0.1 to 1000 ppm of a platinum group metal, preferably from 1 to 500 ppm of a platinum group metal, and more preferably from 5 to 150 ppm of a platinum group metal, based on the combined weight of components (A), (B), and (C). The rate of cure is very slow below 0.1 ppm of platinum group metal. The use of more than 1000 ppm of platinum group metal results in no appreciable increase in cure rate, and is therefore uneconomical.

Mixtures of the aforementioned components (A), (B), (C), (D), and (E) may begin to cure at ambient temperature. To obtain a longer working time or "pot life", the activity of the catalyst under ambient conditions can be retarded or suppressed by the addition of a suitable inhibitor to the silicone composition of the present invention. A platinum catalyst inhibitor retards curing of the present silicone composition at ambient temperature, but does not prevent the composition from curing at elevated temperatures. Suitable platinum catalyst inhibitors include various "ene-yne" systems such as 3-methyl-3-penten-1-yne and 3,5-dimethyl-3-hexen-1-yne; acetylenic alcohols such as 3,5-dimethyl-1-hexyn-3-ol, 1-ethynyl-1-cyclohexanol, and 2-phenyl-3-butyn-2-ol; maleates and fumarates, such as the well known dialkyl, dialkenyl, and dialkoxyalkyl fumarates and maleates; and cyclovinylsiloxanes.

Acetylenic alcohols constitute a preferred class of inhibitors in the silicone composition of the present invention. Compositions containing these inhibitors generally require heating at 70° C. or above to cure at a practical rate.

The concentration of platinum catalyst inhibitor in the present silicone composition is sufficient to retard curing of the composition at ambient temperature without preventing or excessively prolonging cure at elevated temperatures. This concentration will vary widely depending on the particular inhibitor used, the nature and concentration of the hydrosilylation catalyst, and the nature of the organohydrogenpolysiloxane.

Inhibitor concentrations as low as one mole of inhibitor per mole of platinum group metal will in some instances yield a satisfactory storage stability and cure rate. In other instances, inhibitor concentrations of up to 500 or more moles of inhibitor per mole of platinum group metal may be required. The optimum concentration for a particular inhibitor in a given silicone composition can be readily determined by routine experimentation.

The silicone composition of the present invention can also comprise additional ingredients, provided the ingredient does not prevent the composition from curing to form an adhesive having improved contact resistance compared with a similar silicone composition lacking only the hydroxy-functional organic compound. Examples of additional ingredients include, but are not limited to, adhesion promoters, solvents, organopolysiloxane resins, and precrosslinked silicone elastomer particulates.

The silicone composition of the present invention can further comprise at least one adhesion promoter that effects strong unprimed adhesion of the silicone composition to substrates commonly employed in the construction of electronic devices; for example, silicon; passivation coatings, such as silicon dioxide and silicon nitride; glass; metals, such as copper and gold; ceramics; and organic resins, such as polyimide. The adhesion promoter can be any adhesion promoter typically employed in addition-curable silicone compositions, provided it does not adversely affect cure of the composition or the physical properties of the silicone adhesive, particularly contact resistance and volume resistivity.

Preferred adhesion promoters according to the present invention include an adhesion promoter prepared by mixing at least one polysiloxane having at least one silicon-bonded alkenyl group and at least one silicon-bonded hydroxy group per molecule, and at least one epoxy-functional alkoxysilane. The polysiloxane typically has less than about 15 silicon atoms per molecule and preferably has 3 to about 15 silicon atoms per molecule. The alkenyl groups in the polysiloxane typically have 2 to about 6 carbon atoms. Examples of alkenyl groups include, but are not limited to, vinyl, allyl, and hexenyl. Preferably, the alkenyl group is vinyl. The remaining silicon-bonded organic groups in the polysiloxane are independently selected from alkyl and phenyl. The alkyl groups typically have less than about 7 carbon atoms. Suitable alkyl groups are exemplified by, but not limited to, methyl, ethyl, propyl, and butyl. Preferably, the all group is methyl.

The silicon-bonded hydroxy and silicon-bonded alkenyl groups in the polysiloxane can be located at terminal, pendant, or at both terminal and pendant positions. The polysiloxane can be a homopolymer or a copolymer. The structure of the polysiloxane is typically linear or branched. The siloxane units in the polysiloxane may include $HOR^4{}_2SiO_{1/2}$, $R^4(CH_2{=}CH)SiO_{2/2}$, $R^4{}_2SiO_{2/2}$, $C_6H_5SiO_{3/2}$, $R^4(CH_2{=}CH)SiO_{2/2}$, $R^4(C_6H_5)SiO_{2/2}$, $(C_6H_5)_2SiO_{2/2}$, $(C_6H_5)(CH_2{=}CH)SiO_{2/2}$, $(HO)R^4{}_2SiO_{1/2}$, $(CH_2{=}CH)R^4{}_2SiO_{1/2}$, and $(HO)(C_6H_5)R^4SiO_{1/2}$, where $R^4$ is an alkyl group having less than about 7 carbon atoms as exemplified above. Preferably, the polysiloxane is a hydroxy-terminated polydiorganosiloxane containing methylvinylsiloxane units. Such polysiloxanes and methods for their preparation are well known in the art.

The epoxy-functional alkoxysilane contains at least one epoxy-functional organic group and at least one silicon-bonded alkoxy group. The structure of the epoxy-functional alkoxysilane is typically linear or branched. The alkoxy groups in the epoxy-functional alkoxysilane typically have less than about 5 carbon atoms and are exemplified by methoxy, ethoxy, propoxy, and butoxy, wherein methoxy is a preferred alkoxy group. Preferably, the epoxy-functional organic group has a formula selected from:

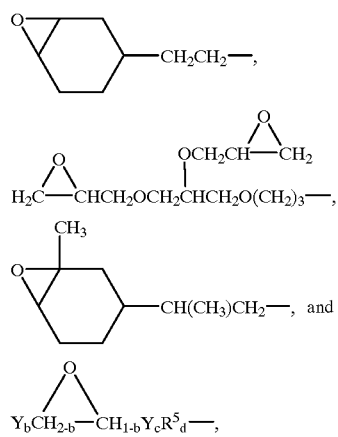

wherein each Y is independently an allyl group having 1 or 2 carbon atoms; b is 0, 1, or 2; c and d are each 0 or 1; and $R^5$ is a divalent hydrocarbon group having no more than 12 carbon atoms. Preferably, $R^5$ is selected from a saturated aliphatic hydrocarbon group, an arylene group, and a divalent group having the formula

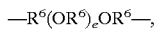

wherein $R^6$ is a divalent saturated aliphatic hydrocarbon group having 1 to 6 carbon atoms and e has a value of from 0 to 8.

The remaining silicon-bonded organic groups in the epoxy-functional alkoxysilane are independently selected from monovalent hydrocarbon groups having less than 7 carbon atoms and fluorinated alkyl groups having less than about 7 carbon atoms. The monovalent hydrocarbon groups are exemplified by, but not limited to, alkyl, such as methyl, ethyl, propyl, and hexyl; alkenyl, such as vinyl and allyl; and aryl such as phenyl. Examples of suitable fluorinated alkyl groups include, but are not limited to, 3,3,3-trifluoropropyl, β-(perfluoroethyl)ethyl, and β-(perfluoropropyl)ethyl.

Preferably, the epoxy-functional alkoxysilane is a monoepoxytrialkoxysilane. Examples of epoxy-functional alkoxysilanes include 3-glycidoxypropyltrimethoxysilane, 1,2-epoxy-4-(2-trimethoxysilylethyl)cyclohexane, and 1,2-epoxy-2-methyl-4-(1-methyl-2-trimethoxysilylethyl)cyclohexane. Methods for the preparation of such silanes are well known in the art.

The two components of the aforementioned adhesion promoter can be either mixed directly together and added to the composition of the present invention or added separately to the composition. Typically the relative amount of the polysiloxane and silane are adjusted to provide about one mole of the silane per mole of silanol groups in the polysiloxane.

The preceding class of adhesion promoters are disclosed in U.S. Pat. No. 4,087,585, which is hereby incorporated by reference to teach adhesion promoters suitable for use in the silicone composition of the present invention.

Preferably, the polysiloxane and epoxy-functional alkoxysilane are first mixed and then added to the composition. More preferably, the polysiloxane and silane are reacted at an elevated temperature. The organopolysiloxane and the silane can be reacted using well known methods of reacting silanol-containing organosiloxanes with alkoxysilanes. The reaction is typically carried out in the presence of a basic catalyst. Examples of suitable catalysts include, but are not limited to, alkali metal hydroxides, alkali metal alkoxides, and alkali metal silanoates. Preferably, the reaction is carried out using about a 1:1 mole ratio of alkoxy groups in the epoxy-functional alkoxysilane to silicon-bonded hydroxy groups in the polysiloxane. The polysiloxane and silane can be reacted either in the absence of a diluent or in the presence of an inert organic solvent, such as toluene. The reaction is preferably carried out at an elevated temperature, for example, from about 80 to about 150° C.

Preferred adhesion promoters according to the present invention also include at least one organopentasiloxane having the formula:

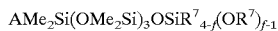

$AMe_2Si(OMe_2Si)_3OSiR^7{}_{4-f}(OR^7)_{f-1}$ wherein A is hydrogen or an aliphatically unsaturated monovalent hydrocarbon group, $R^7$ is alkyl, and f is an integer from 2 to 4.

Examples of aliphatically unsaturated monovalent hydrocarbon groups represented by A include, but are not limited to, vinyl, allyl, butenyl, hexenyl, and isopropenyl. Preferably A is a hydrogen atom or a vinyl group, based on availability of starting materials and cost. The alkyl groups represented by $R^7$ typically have 1 to about 6 carbon atoms and preferably have 1 to 3 carbon atoms. Examples of suitable alkyl groups include, but are not limited to methyl, ethyl, propyl, butyl, pentyl, and hexyl. Alkyl groups containing at least 3 carbon atoms can have a branched or unbranched structure. Preferably, $R^7$ is methyl or ethyl, based on availability of starting materials and cost.

The organopentasiloxane can be prepared by first reacting hexamethylcyclotrisiloxane with an organosilane having the formula $AMe_2SiX$ to produce a tetrasiloxane having the formula $AMe_2Si(OMe_2Si)_3X$ where A is defined above and X is a halogen. The tetrasiloxane is then hydrolyzed to produce an alpha-hydroxytetrasiloxane having the formula $AMe_2Si(OMe_2Si)_3OH$ wherein A is defined above. The alpha-hydroxytetrasiloxane is reacted with an organosiloxane having the formula $R^7{}_{4-f}Si(OR^7)_f$ wherein $R^7$ and f are defined above.

A specific example of an organopentasiloxane according to the present invention is 1-vinyl-9,9,9-trimethoxyoctamethylpentasiloxane, having the formula $ViMe_2SiO(Me_2SiO)_3Si(OMe)_3$ where Vi is vinyl and Me is methyl. This organopentasiloxane is particularly preferred in silicone compositions of the present invention comprising a microencapsulated hydrosilylation catalyst. Importantly, the organopentasiloxane does not cause dissolution of the silicone resin in the microencapsulated catalyst under ambient conditions. Also, the aforementioned organopentasiloxane exhibits superior adhesion to metals commonly used in the fabrication of electronic devices.

The preceding class of adhesion promoters is disclosed in U.S. Pat. No. 5,194,649, which is hereby incorporated by reference to teach adhesion promoters suitable for use in the silicone composition of the present invention.

The concentration of the adhesion promoter in the composition of the present invention is sufficient to effect adhesion of the composition to a substrate, such as those cited above. The concentration can vary over a wide range depending on the nature of the adhesion promoter, the type of substrate, and the desired adhesive bond strength. The concentration of the adhesion promoter is generally from 0.01 to about 10 percent by weight, based on the total weight composition. However, the optimum concentration of the adhesion promoter can be readily determined by routine experimentation.

The silicone composition of the present invention can further comprise an appropriate quantity of a solvent to lower the viscosity of the composition and facilitate the preparation, handling, and application of the composition. Preferably, the solvent has a normal boiling point greater than the cure temperature of the composition. Otherwise excessive volatilization of the solvent during curing may cause formation of voids in the silicone adhesive. Examples of suitable solvents include, but are not limited to, saturated hydrocarbons having from 1 to about 20 carbon atoms; aromatic hydrocarbons such as xylenes; mineral spirits; halohydrocarbons; esters; ketones; silicone fluids such as linear, branched, and cyclic polydimethylsiloxanes; and mixtures of such solvents. The optimum concentration of a particular solvent in the present silicone composition can be readily determined by routine experimentation.

The silicone composition of the present invention can also comprise at least one organopolysiloxane resin consisting essentially of $R^8{}_3SiO_{1/2}$ siloxane units and $SiO_{4/2}$ siloxane units wherein each $R^8$ is independently selected from monovalent hydrocarbon and monovalent halogenated hydrocarbon groups having from 1 to 20 carbon atoms and the mole ratio of $R^8{}_3SiO_{1/2}$ units to $SiO_{4/2}$ units in the organopolysiloxane resin is from 0.65 to 1.9. Preferably, the resin contains an average of from about 3 to 30 mole percent of alkenyl groups. The mole percent of alkenyl groups in the resin is defined here as the ratio of the number of moles of alkenyl-containing siloxane units in the resin to the total number of moles of siloxane units in the resin, multiplied by 100.

It is generally understood that when the silicone composition further comprises an alkenyl-containing organopolysiloxane resin, crosslinking occurs when the sum of the average number of alkenyl groups per molecule in component (A) and the organopolysiloxane resin combined and the average number of silicon-bonded hydrogen atoms per molecule in the resin is greater than four. Also, in such compositions, the concentration of the organohydrogenpolysiloxane is typically sufficient to provide from 0.5 to 5.0 silicon-bonded hydrogen atoms and preferably 1 to 2 silicon-bonded hydrogen atoms per alkenyl group in component (A) and the organopolysiloxane resin combined.

The concentration of the organopolysiloxane resin in the silicone composition of the present invention is typically from 5 to 90 parts by weight per 100 parts by weight of component (A) and the resin combined.

The organopolysiloxane resin of the present invention can be prepared by well known methods in the art as exemplified in U.S. Pat. No. 2,676,182 to Daudt et al.

The silicone composition of the present invention can further comprise at least one precrosslinked silicone elastomer particulate. The silicone particulate provides the cured composition with good elasticity, low hardness, and a low permanent compression set. The particulate is a powder of a precrosslinked silicone elastomer consisting of spherical or irregularly shaped particles. The particles typically have an average particle size of from 0.1 to 500 μm and preferably have an average particle size of from 0.5 to 300 μm.

The concentration of the precrosslinked silicone elastomer particulate in the silicone composition of the present invention is typically from 10 to 150 parts by weight and is preferably from 15 to 80 parts by weight, per 100 parts by weight of components (A) and (B) combined.

Several methods of preparing precrosslinked silicone elastomer particulates are known in the art, including spray drying and curing a curable organopolysiloxane composition as disclosed in Japanese Patent Application No. 59-96122; spray drying an aqueous emulsion containing a curable organopolysiloxane composition as disclosed in U.S. Pat. No. 4,761,454; curing an emulsion of a liquid silicone rubber microsuspension as disclosed in U.S. Pat. No. 5,371,139; and pulverizing a precrosslinked silicone elastomer.

The silicone composition of the present invention can be a one-part composition comprising components (A) through (E) in a single part or, alternatively, a multi-part composition comprising components (A) through (E) in two or more parts, provided components (A), (B), and (E) are not present in the same part. Also, to prevent reaction of the organohydrogenpolysiloxane and hydroxy-functional organic compound in the presence of the hydrosilylation catalyst and the consequent generation of hydrogen gas, preferably component (B), (D), and (E) are not present in the same part. For example, a multi-part silicone composition can comprise a first part containing a portion of component (A), a portion of component (C), all of component (D), and all of component (E) and a second part containing the remaining portions of components (A) and (C) and all of component (B).

The one-part silicone composition of the instant invention is typically prepared by combining components (A) through (E) and any optional ingredients in the stated proportions at ambient temperature with or without the aid of a solvent, which is described above. Although the order of addition of the various components is not critical if the silicone composition is to be used immediately, the hydrosilylation catalyst is preferably added last at a temperature below about 30° C. to prevent premature curing of the composition. Also, the multi-part silicone composition of the present invention can be prepared by combining the particular components designated for each part.

Mixing can be accomplished by any of the techniques known in the art such as milling, blending, and stirring, either in a batch or continuous process. The particular device is determined by the viscosity of the components and the viscosity of the final silicone composition.

The silicone composition of the present invention can be applied to a wide variety of solid substrates including, but not limited to, metals such as aluminum, gold, silver, tin-lead, nickel, copper, and iron, and their alloys; silicon; fluorocarbon polymers such as polytetrafluoroethylene and polyvinylfluoride; polyamides such as Nylon; polyimides; polyesters; ceramics; and glass. Furthermore, the silicone composition of the instant invention can be applied to a substrate by any suitable means such as spraying, syringe dispensing, screen or stencil printing, or ink jet printing.

A silicone adhesive according to the present invention comprises a reaction product of the silicone composition containing components (A) through (E), described above. The silicone composition of this invention can be cured at a temperature from about room temperature to about 200° C., preferably from about 70 to about 200° C., and more preferably from about 125 to about 175° C., for a suitable length of time. For example, the present silicone composition cures in less than about 2 hours at 150° C.

The silicone composition of the present invention has numerous advantages, including good flow, low VOC (volatile organic compound) content, and adjustable cure. Moreover, the present silicone composition cures to form a silicone adhesive having good adhesion and unexpectedly superior electrical properties.

With regard to flow, the present silicone composition possesses the rheological properties required for a number of applications and is easily dispensed and applied using standard equipment.

Furthermore, absent optional solvent, the silicone composition of the present invention has a very low VOC content. Consequently, the present silicone composition avoids the health, safety, and environmental hazards associated with solvent-borne silicone compositions. In addition, the solventless composition of the present invention typically undergoes less shrinkage during curing than solvent-borne silicone compositions.

The silicone composition of the present invention cures rapidly at moderately elevated temperatures without the formation of detectable by-products. The cure rate of the silicone composition can be conveniently adjusted by regulating the concentration of catalyst, concentration of inhibitor, and cure temperature.

Further, the silicone composition of the present invention cures to form a silicone adhesive having good adhesion to a wide variety of materials, including metals, glass, silicon, silicon dioxide, ceramics, polyesters, and polyimides.

Importantly, the silicone composition of the present invention cures to form a silicone adhesive having unexpectedly improved electrical conductivity, as evidenced by a low initial contact resistance, compared with a similar silicone composition lacking only the hydroxy-functional organic compound.

The silicone composition of the present invention is useful for preparing an electrically conductive silicone adhesive. The silicone adhesive of the present invention has numerous uses, including die attach adhesives, solder replacements, and electrically conductive coatings and gaskets. In particular, the silicone adhesive is useful for bonding electronic components to flexible or rigid substrates.

EXAMPLES

The following examples are presented to fisher illustrate the silicone composition of this invention, but are not to be considered as limiting the invention, which is delineated in the appended claims. Unless otherwise noted, all parts and percentages reported in the examples are by weight. The following methods and materials were employed in the examples:

The contact resistance of a silicone adhesive on copper was determined using a Keithley Instruments Model 580 Micro-ohm Meter equipped with a 4-pole probe having spring-loaded, gold-plated, chisel point tips. A contact resistance joint was prepared by bonding two rectangular copper bars (0.254 cm×0.254 cm×2.032 cm) with the silicone composition according to the following procedure: One face (rectangular) of each copper bar was cleaned by sanding with 400 grit silicon carbide waterproof sandpaper, scrubbing with a Kimwipe dampened with heptane followed by a Kimwipe dampened with isopropanol, and air drying at room temperature for at least one hour. A small aliquot of the silicone composition was applied at approximately the center (lengthwise) of one bar. A second bar was then oriented perpendicular to the first bar with the center (lengthwise) of each bar facing the other and the silicone composition forming a bondline of 0.025 cm. Finally, the cross-shaped (+) fixture was cured in a forced air oven at 150° C. for two hours. After allowing the sample to cool to room temperature, the initial contact resistance of the joint was measured. The reported values for contact resistance, expressed in units of ohms, represent the average of three measurements, each performed on identically prepared test specimens.

The contact resistance of a silicone adhesive on tin-lead coated copper was determined using the procedure described immediately above, except the copper bars were first plated with a tin-lead alloy (60/40) to a minimum thickness of $2.54 \times 10^{-4}$ cm.

The volume resistivity of a silicone adhesive was determined using a Keithley Instruments Model 580 Micro-ohm Meter equipped with a four-point probe having spring-loaded, gold-plated, spherical tips. A test specimen was prepared by first placing two strips of 3M Scotch brand tape 0.25 cm apart on a glass microscope slide to form a channel extending the length of the slide. An aliquot of the silicone composition was deposited at one end of the slide and over the channel. The composition was then spread over the entire channel by drawing a razor blade through the composition and across the surface at an angle of 45°. The tape strips were removed and the specimen was cured in a forced air oven at 150° C. for two hours. After allowing the sample to cool to room temperature, the voltage drop between the two inner probe tips was measured at an appropriate current to give a resistance value in ohms. The initial volume resistivity of the adhesive was then calculated using the following equation:

$$V=R(W \times T/L)$$

where V is volume resistivity in ohm-centimeters, R is resistance (ohms) of the adhesive measured between two inner probe tips spaced 2.54 cm apart, W is the width of the adhesive layer in centimeters, T is the thickness of the adhesive layer in centimeters, and L is the length of the adhesive layer between the inner probes in centimeters (2.54 cm). The thickness of the adhesive layer, typically about 0.004 cm, was determined using an Ames Model LG3500-0-04 thickness gauge. The reported values for volume resistivity, expressed in units of ohm-centimeters, represent the average of three measurements, each performed on an identically prepared test specimen.

Resin/Polymer Blend: a mixture consisting of (i) 31% of Resin A, an organopolysiloxane resin consisting essentially of $CH_2=CH(CH_3)_2SiO_{1/2}$ units, $(CH_3)_3SiO_{1/2}$ units, and $SiO_{4/2}$ units, wherein the mole ratio of $CH_2=CH(CH_3)_2SiO_{1/2}$ units and $(CH_3)_3SiO_{1/2}$ units combined to $SiO_{4/2}$ units is about 0.7, and the resin has a weight-average molecular weight of about 22,000, a polydispersity of about 5, and contains about 1.8% by weight (about 5.5 mole percent) of vinyl groups and (ii) 67% of Polymer A, a dimethylvinylsiloxy-terminated polydimethylsiloxane having a viscosity of about 2 Pa·s at 25° C.

Resin B: an organopolysiloxane resin consisting essentially of $CH_2=CH(CH_3)_2SiO_{1/2}$ units, $(CH_3)_3SiO_{1/2}$ units, and $SiO_{4/2}$ units, wherein the mole ratio of $CH_2=CH(CH_3)_2SiO_{1/2}$ units and $(CH_3)_3SiO_{1/2}$ units combined to $SiO_{4/2}$ units is about 1.8, the resin has a viscosity of about $2.1 \times 10^{-4}$ $m^2/s$ at 25° C., and the resin contains about 5.6% by weight (about 15 mole percent) of vinyl groups.

Polymer B: a dimethylvinylsiloxy-terminated poly(dimethylsiloxane/methylphenylsiloxane) having the average formula $ViMe_2SiO(Me_2SiO)_g(PhMeSiO)_h(SiMe_2Vi)$ as determined by $^{29}Si$ NMR, wherein Me is methyl, Vi is vinyl, g is about 465, h is about 199, and the viscosity of the polymer is about 28.2 Pa·s at 25° C.

Polymer C: a dimethylvinylsiloxy-terminated polydimethylsiloxane having a viscosity of about 55 Pa·s at 25° C.

Crosslinking Agent A: a trimethylsiloxy-terminated poly(methylhydrogensiloxane) having a viscosity of about 30 $mm^2/s$ and containing about 1.6% of silicon-bonded hydrogen atoms.

Crosslinking Agent B: an organohydrogenpolysiloxane consisting essentially of 9.3 mol % $Me_3SiO_{1/2}$ units, 32.6 mol % $Me_2SiO_{2/2}$ units, 55.8 mol % $HMeSiO_{2/2}$ units, and 2.3 mol % $MeSiO_{3/2}$ units, wherein the organohydrogenpolysiloxane has a viscosity of about 16 $mm^2/s$ at 25° C. and contains about 0.8% of silicon-bonded hydrogen atoms.

Crosslinking Agent C: an organohydrogenpolysiloxane consisting essentially of $H(CH_3)_2SiO_{1/2}$ units, $(CH_3)_3SiO_{1/2}$ units, and $SiO_{4/2}$ units, wherein the organohydrogenpolysiloxane contains about 1.0 percent by weight of silicon-bonded hydrogen atoms and has a viscosity of about $2.4 \times 10^{-5}$ $m^2/s$.

Adhesion Promoter A: an organopentasiloxane having the formula $ViMe_2SiO(Me_2SiO)_3Si(OMe)_3$.

Adhesion Promoter/Inhibitor blend: a mixture consisting of 97% of Adhesion Promoter A and 3% of 2-phenyl-3-butyn-2-ol.

Adhesion Promoter B: a reaction product of a hydroxy-terminated poly(dimethylsiloxane/methylvinylsiloxane) having an average of two dimethylsiloxane units and two methylvinylsiloxane units per molecule and glycidoxypropyltrimethoxysilane. The product was prepared by reacting equal parts by weight of the siloxane and glycidoxypropyltrimethoxysilane at a temperature of 140° C. for 2 hours in the presence of a potassium catalyst. The reaction mixture was neutralized with bis(dimethylvinylsilyl) vinylphosphonate and devolatilized for two hours at a temperature of 130° C. and a pressure of 6.7 kPa.

Filler A: a silver flake sold under the name SF-22 by Degussa Corporation. The filler has a tap density of 3.5 $g/cm^3$; surface area of 1.07 $m^2/g$; weight loss of 0.05% at 110° C.; weight loss of 0.45% at 538° C.; and a particle size distribution of 9.7 μm (95%), 7.5 μm (90%), 3.0 μm (50%), and 1.0 μm (10%).

Filler B: a silver flake sold under the name RA-127 by Chemet Corporation. The filler has a mean particle size of 3.9 μm, a surface area of 0.87 $m^2/g$, an apparent density of 1.55 $g/cm^3$, and a tap density of 2.8 $g/cm^3$.

Catalyst: a mixture consisting of 40% of a complex of platinum with 1,3-divinyl-1,1,3,3-tetramethyldisiloxane dispersed in a thermoplastic silicone resin, wherein the resin consists of 78 mol % monophenylsiloxane units and 22 mol % dimethylsiloxane units and the resin has a softening point of 80–90° C.; 55% of Polymer A, a dimethylvinylsiloxy-terminated polydimethylsiloxane having a viscosity of about 2 Pa·s at 25° C.; and 5% of a hexamethyldisilazane-treated fumed silica. The catalyst has a platinum content of about 0.16%.

TERGITOL TMN-6: a nonionic surfactant commercially available from Union Carbide Corporation. The surfactant consists of 87% of 2,6,8-trimethyl-4-nonyloxypolyethyeneoxyethanol (reaction product of 2,6,8-trimethyl-4-nonanol and ethylene oxide), 10% of water, 2% of polyethylene glycol, and 1% of 2,6,8-trimethyl-4-nonanol.

TWEEN 20: polyoxyethylene (20) sorbitan monolaurate, commercially available from ICI Americas, Inc., Wilmington, Del. TWEEN 20 has a molecular weight of 1227.54.

Comparative Example 1

A silicone composition was prepared by first combining 14.34 parts of Resin/Polymer Blend, 1.12 parts of Catalyst, 0.70 part of Adhesion Promoter/Inhibitor Blend, 1.81 parts of Adhesion Promoter A, and 1.06 parts of Crosslinking Agent A in a 4 oz. plastic cup. The components were then mixed for 26 seconds using an AM 501 Hauschild dental mixer. Then 79.98 parts of Filler A was added to the mixture and the components were blended for 26 seconds. The mixture was cooled to room temperature by immersing the cup in a water bath and the aforementioned mixing and cooling procedure was repeated. The contact resistance (copper) and volume resistivity of the cured silicone adhesive are shown in Table 1.

Comparative Example 2

A silicone composition was prepared by combining 0.04 part (1%) of TWEEN 20 with 4.00 parts of the silicone composition in Comparative Example 1 in a ¼ oz. plastic cup. The components were mixed for 26 seconds using an AM 501 Hauschild dental mixer. The mixture was then cooled to room temperature and the aforementioned mixing and cooling procedure was repeated. The contact resistance (copper) and volume resistivity of the cured silicone adhesive are shown in Table 1.

Examples 1–16

In each of Examples 1–16, a silicone composition was prepared using the method of Comparative Example 2, except 0.04 part (1%) of the hydroxy-functional organic compound specified in Table 1 was substituted for TWEEN 20. The contact resistance (copper) and volume resistivity values of the cured silicone adhesives are shown in Table 1.

TABLE 1

| Example | Hydroxy-functional Organic Compound | Contact Resistance ($\Omega$) | Volume Resistivity ($\Omega \cdot cm$) |
| --- | --- | --- | --- |
| Comp. 1 | — | $8.45 \times 10^{-1}$ | $2.31 \times 10^{-4}$ |
| Comp. 2 | TWEEN 20, [polyoxyethylene (20) sorbitan monolaurate] | $1.52 \times 10^{1}$ | $7.24 \times 10^{-3}$ |
| 1 | 1-undecanol | $5.24 \times 10^{-3}$ | $2.25 \times 10^{-4}$ |
| 2 | benzopinacole | $2.54 \times 10^{-3}$ | $4.27 \times 10^{-4}$ |
| 3 | glycerol | $3.12 \times 10^{-3}$ | $2.58 \times 10^{-4}$ |
| 4 | ethylene glycol | $2.79 \times 10^{-3}$ | $3.73 \times 10^{-4}$ |
| 5 | TERGITOL TMN-6 | $2.86 \times 10^{-3}$ | $9.72 \times 10^{-4}$ |
| 6 | polyethylene glycol, average M. W. 200 | $8.69 \times 10^{-3}$ | $2.27 \times 10^{-2}$ |
| 7 | diethylene glycol butyl ether | $1.34 \times 10^{-2}$ | $1.64 \times 10^{-3}$ |
| 8 | sorbitol | $7.18 \times 10^{-2}$ | $5.17 \times 10^{-4}$ |
| 9 | citric acid | $1.48 \times 10^{-1}$ | $8.13 \times 10^{-3}$ |
| 10 | ascorbic acid | $6.58 \times 10^{-3}$ | $6.25 \times 10^{-4}$ |
| 11 | vitamin E | $6.71 \times 10^{-3}$ | $2.82 \times 10^{-2}$ |
| 12 | hydroquinone | $4.06 \times 10^{-3}$ | $1.51 \times 10^{-2}$ |
| 13 | 2',4'-dihydroxyacetophenone | $8.04 \times 10^{-3}$ | $3.68 \times 10^{-3}$ |
| 14 | 1,3-dihydroxyacetone dimer | $3.67 \times 10^{-4}$ | $2.76 \times 10^{-4}$ |
| 15 | 1-monodecanoyl-rac-glycerol | $2.37 \times 10^{-2}$ | $2.28 \times 10^{-4}$ |
| 16 | DL-glyceraldehyde | $1.70 \times 10^{-2}$ | $3.36 \times 10^{-4}$ |

Comparative Example 3

A silicone composition was prepared by first combining 14.42 parts of Resin/Polymer Blend, 1.23 parts of Catalyst, 0.69 part of Adhesion Promoter/Inhibitor Blend, 1.76 parts of Adhesion Promoter A, and 1.26 parts of Crosslinking Agent A in a 2 oz. plastic cup. The components were then mixed for 26 seconds using an AM 501 Hauschild dental mixer. Then 80.64 parts of Filler A was added to the mixture and the components were blended for 26 seconds. The mixture was cooled to room temperature by immersing the cup in a water bath and the aforementioned mixing and cooling procedure was repeated. The cured silicone adhesive had a contact resistance (tin-lead coated copper) of $4.84 \times 10^{-2}$ $\Omega$.

Comparative Example 4

A silicone composition was prepared by combining 0.05 part (1%) of methyl oleate with 5.00 parts of the silicone composition in Comparative Example 3 in a ¼ oz. plastic cup. The components were mixed for 26 seconds using an AM 501 Hauschild dental mixer. The mixture was then cooled to room temperature and the aforementioned mixing and cooling procedure was repeated. The cured silicone adhesive had a contact resistance (tin-lead coated copper) of $3.83 \times 10^{-1}$ $\Omega$.

Examples 17

A silicone composition was prepared using the method of Comparative Example 4, except 0.05 part of glycerol was substituted for methyl oleate. The cured silicone adhesive had a contact resistance (tin-lead coated copper) of $1.67 \times 10^{-3}$ $\Omega$.

Example 18

A silicone composition was prepared using the method of Comparative Example 4, except 0.05 part of 1-monodecanoyl-rac-glycerol was substituted for methyl oleate. The cured silicone adhesive had a contact resistance (tin-lead coated copper) of $2.11 \times 10^{-2}$ $\Omega$.

Comparative Example 5

A silicone composition was prepared by first combining 11.22 parts of Polymer B, 1.14 parts of Catalyst, 0.67 part of Adhesion Promoter/Inhibitor Blend, 1.87 parts of Adhesion Promoter A, and 1.60 parts of Crosslinking Agent B in a 1 oz. plastic cup. The components were then mixed for 20 seconds using an AM 501 Hauschild dental mixer. Then 83.50 parts of Filler B was added to the mixture and the components were blended for 26 seconds. The mixture was cooled to room temperature by immersing the cup in a water bath and the aforementioned mixing and cooling procedure was repeated. The cured silicone adhesive had a contact resistance (copper) of $2.71 \times 10^{-3}$ $\Omega$ and a volume resistivity of $1.6 \times 10^{-4}$ $\Omega \cdot cm$.

Example 19

A silicone composition was prepared by first combining 10.96 parts of Polymer B, 0.33 part of glycerol, 1.14 parts of Catalyst, 0.62 part of Adhesion Promoter/Inhibitor Blend, 1.73 parts of Adhesion Promoter A, and 1.65 parts of Crosslinking Agent B in a 1 oz. plastic cup. The components were then mixed for 20 seconds using an AM 501 Hauschild dental mixer. Then 83.57 parts of Filler B was added to the mixture and the components were blended for 26 seconds. The mixture was cooled to room temperature by immersing the cup in a water bath and the aforementioned mixing and cooling procedure was repeated. The cured silicone adhesive had a contact resistance (copper) of $7.25 \times 10^{-5}$ $\Omega$ and a volume resistivity of $1.2 \times 10^{-4}$ $\Omega \cdot cm$.

Example 20

A silicone composition was prepared using the method of Example 19 and the following concentrations of components: 10.27 parts of Polymer B, 1.05 part of glycerol, 1.16 parts of Catalyst, 0.77 part of Adhesion Promoter/Inhibitor Blend, 1.61 parts of Adhesion Promoter A, 1.58 parts of Crosslinking Agent B, and 83.56 parts of Filler B. The cured silicone adhesive had a contact resistance (copper) of $3.25 \times 10^{-5}$ Ω and a volume resistivity of $6.8 \times 10^{-5}$ Ω·cm.

Comparative Example 6

A silicone composition was prepared by first combining 8.28 parts of Resin B, 1.13 parts of Catalyst, 0.60 part of Adhesion Promoter/Inhibitor Blend, 1.80 parts of Adhesion Promoter B, and 4.63 parts of Crosslinking Agent C in a 1 oz. plastic cup. The components were then mixed for 26 seconds using an AM 501 Hauschild dental mixer. Then 83.57 parts of Filler B was added to the mixture and the components were blended for 26 seconds. The mixture was cooled to room temperature by immersing the cup in a water bath and the aforementioned mixing and cooling procedure was repeated. The cured silicone adhesive had a contact resistance (copper) of $4.03 \times 10^{-3}$ Ω and a volume resistivity of $2.0 \times 10^{-4}$ Ω·cm.

Example 21

A silicone composition was prepared by first combining 7.50 parts of Resin B, 0.99 part of glycerol, 1.11 parts of Catalyst, 0.66 part of Adhesion Promoter/Inhibitor Blend, 1.89 parts of Adhesion Promoter B, and 4.31 parts of Crosslinking Agent C in a 1 oz. plastic cup. The components were then mixed for 26 seconds using an AM 501 Hauschild dental mixer. Then 83.55 parts of Filler B was added to the mixture and the components were blended for 26 seconds. The mixture was cooled to room temperature by immersing the cup in a water bath and the aforementioned mixing and cooling procedure was repeated. The cured silicone adhesive had a contact resistance (copper) of $7.8 \times 10^{-5}$ Ω and a volume resistivity of $9.8 \times 10^{-5}$ Ω·cm.

Comparative Example 7

A silicone composition was prepared by first combining 7.37 parts of Resin B, 2.76 parts of Polymer C, 0.98 part of Catalyst, 0.64 part of Adhesion Promoter/Inhibitor Blend, 0.82 part of Adhesion Promoter A, and 3.74 parts of Crosslinking Agent C in a 1 oz. plastic cup. The components were then mixed for 20 seconds using an AM 501 Hauschild dental mixer. Then 83.68 parts of Filler B was added to the mixture and the components were blended for 26 seconds. The mixture was cooled to room temperature by immersing the cup in a water bath and the aforementioned mixing and cooling procedure was repeated. The cured silicone adhesive had a contact resistance (copper) of $9.36 \times 10^{-3}$ Ω and a volume resistivity of $1.39 \times 10^{-4}$ Ω·cm.

Example 22

A silicone compositions was prepared by combining 0.05 part (1%) of glycerol with 5.06 parts of the silicone composition in Comparative Example 7 in a 1 oz. plastic cup. The components were mixed for 26 seconds using an AM 501 Hauschild dental mixer. The cured silicone adhesive had a contact resistance (copper) of $1.97 \times 10^{-4}$ Ω and a volume resistivity of $9.8 \times 10^{-5}$ Ω·cm.

Comparative Example 8

A silicone composition was prepared by first combining 8.32 parts of Polymer B, 1.12 parts of Catalyst, 0.73 part of Adhesion Promoter/Inhibitor Blend, 3.60 parts of Resin B, 1.81 parts of Adhesion Promoter A, and 3.52 parts of Crosslinking Agent B in a 1 oz. plastic cup. The components were then mixed for 20 seconds using an AM 501 Hauschild dental mixer. Then 80.89 parts of Filler B was added to the mixture and the components were blended for 26 seconds. The mixture was cooled to room temperature by immersing the cup in a water bath and the aforementioned mixing and cooling procedure was repeated. The cured silicone adhesive had a contact resistance (copper) of $4.83 \times 10^{-3}$ Ω and a volume resistivity of $1.47 \times 10^{-4}$ Ω·cm.

Example 23

A silicone composition was prepared by first combining 7.70 parts of Polymer B, 1.13 parts of Catalyst, 0.72 part of Adhesion Promoter/Inhibitor Blend, 3.34 parts of Resin B, 1.01 parts of glycerol, 1.82 parts of Adhesion Promoter A, and 3.37 parts of Crosslinking Agent B in a 1 oz. plastic cup. The components were then mixed for 20 seconds using an AM 501 Hauschild dental mixer. Then 80.92 parts of Filler B was added to the mixture and the components were blended for 26 seconds. The mixture was cooled to room temperature by immersing the up in a water bath and the aforementioned mixing and cooling procedure was repeated. The cured silicone adhesive had a contact resistance (copper) of $9.0 \times 10^{-5}$ Ω and a volume resistivity of $1.13 \times 10^{-4}$ Ω·cm.

That which is claimed is:

1. A curable silicone composition for preparing a silicone adhesive, the composition comprising:
    (A) an organopolysiloxane containing an average of at least two silicon-bonded alkenyl groups per molecule;
    (B) an organohydrogenpolysiloxane containing an average of at least two silicon-bonded hydrogen atoms per molecule in a concentration sufficient to cure the composition;
    (C) an electrically conductive filler in an amount sufficient to impart electrical conductivity to the silicone adhesive, wherein the filler comprises particles having at least an outer surface of a metal selected from silver, gold, platinum, palladium, and alloys thereof;
    (D) an effective amount of a hydroxy-functional organic compound having a molecular weight up to about 1000 and containing at least one hydroxy group per molecule, provided the compound is free of acetylenic hydroxy groups and the compound does not substantially inhibit cure of the composition; and
    (E) a catalytic amount of a hydrosilylation catalyst.

2. The silicone composition according to claim 1, wherein the organopolysiloxane is a polydiorganosiloxane having the formula $R^2R^1{}_2SiO(R^1{}_2SiO)_a SiR^1{}_2R^2$ wherein each $R^1$ is independently selected from monovalent hydrocarbon and monovalent halogenated hydrocarbon groups free of aliphatic unsaturation; $R^2$ is alkenyl, and a has a value such that the viscosity of the polydiorganosiloxane at 25° C. is from 0.05 to about 200 Pa·s.

3. The silicone composition according to claim 1, wherein the concentration of component (B) is sufficient to provide from 1.0 to 2.0 silicon-bonded hydrogen atoms per alkenyl group in component (A).

4. The silicone composition according to claim 1, wherein the filler comprises particles consisting of silver, gold, platinum, palladium, or alloys thereof.

5. The silicone composition according to claim 4, wherein the particles consist of silver.

6. The silicone composition according to claim 1, wherein the filler has a concentration from about 20 to about 50 percent by volume, based on the total volume of the composition.

7. The silicone composition according to claim 1, wherein the composition cures at a temperature of from about room temperature to about 200° C.

8. The silicone composition according to claim 7, wherein the hydroxy-functional organic compound has a normal boiling point greater than the cure temperature of the composition.

9. The silicone composition according to claim 1, wherein the hydroxy-functional organic compound is selected from at least one monohydric alcohol, at least one dihydric alcohol, at least one polyhydric alcohol, at least one phenol, at least one sugar, at least one hydroxy aldehyde, at least one hydroxy ketone, at least one hydroxy acid, at least one hydroxy ester, and a mixture comprising at least two of the aforementioned compounds.

10. The silicone composition according to claim 9, wherein the hydroxy-functional organic compound is selected from at least one monohydric alcohol, at least one dihydric alcohol, at least one polyhydric alcohol, and a mixture comprising at least two of the aforementioned compounds.

11. The silicone composition according to claim 1, wherein the concentration of component (D) is from 0.5 to 1.5 percent by weight, based on the total weight of the composition.

12. The silicone composition according to claim 1, wherein the hydrosilylation catalyst comprises platinum.

13. The silicone composition according to claim 12, wherein the hydrosilylation catalyst is a microencapsulated platinum catalyst.

14. The silicone composition according to claim 1, further comprising an adhesion promoter.

15. The silicone composition according to claim 14, wherein the adhesion promoter is selected from (i) an adhesion promoter prepared by mixing at least one polysiloxane having at least one silicon-bonded alkenyl group and at least one silicon-bonded hydroxy group per molecule, and at least one epoxy-functional alkoxysilane and (ii) at least one organopentasiloxane having the formula:

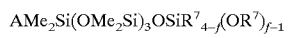
$AMe_2Si(OMe_2Si)_3OSiR^7_{4-f}(OR^7)_{f-1}$ wherein A is hydrogen or an aliphatically unsaturated monovalent hydrocarbon group, $R^7$ is alkyl, and f is an integer from 2 to 4.

16. The silicone composition according to claim 7, further comprising a solvent having a normal boiling point greater than the cure temperature of the composition.

17. The silicone composition according to claim 1, further comprising at least one organopolysiloxane resin consisting essentially of $R^8_3SiO_{1/2}$ siloxane units and $SiO_{4/2}$ siloxane units wherein each $R^8$ is independently selected from monovalent hydrocarbon and monovalent halogenated hydrocarbon groups having from 1 to 20 carbon atoms and the mole ratio of $R^8_3SiO_{1/2}$ units to $SiO_{4/2}$ units is from 0.65 to 1.9.

18. The silicone composition according to claim 17, wherein the resin contains an average of from about 3 to 30 mole percent of alkenyl groups.

19. The silicone composition according to claim 1, further comprising a precrosslinked silicone elastomer particulate.

20. A silicone adhesive comprising a reaction product of the composition of claim 1.

21. A silicone adhesive comprising a reaction product of the composition of claim 5.

22. A multi-part curable silicone composition for preparing a silicone adhesive, the composition comprising:
   (A) an organopolysiloxane containing an average of at least two silicon-bonded alkenyl groups per molecule;
   (B) an organohydrogenpolysiloxane containing an average of at least two silicon-bonded hydrogen atoms per molecule in a concentration sufficient to cure the composition;
   (C) an electrically conductive filler in an amount sufficient to impart electrical conductivity to the silicone adhesive, wherein the filler comprises particles having at least an outer surface of a metal selected from silver, gold, platinum, palladium, and alloys thereof;
   (D) an effective amount of a hydroxy-functional organic compound having a molecular weight up to about 1000 and containing at least one hydroxy group per molecule, provided the compound is free of acetylenic hydroxy groups and the compound does not substantially inhibit cure of the composition; and
   (E) a catalytic amount of a hydrosilylation catalyst, provided components (A) (B), and (E) are not present in the same part.

23. The composition of claim 1, wherein component (D) is selected from 1-undecanol; benzopinacole; glycerol; ethylene glycol; polyethylene glycol; diethylene glycol butyl ether; sobitol; citric acid; ascorbic acid; vitamin E; hydroquinone; 2',4'-dihydroxyacetophenone; 1,3-dihydroxyacetone dimer; 1-monodecanoyl-rac-glycerol; DL-glyceraldehyde; and a nonionic surfactant comprising 2,6,8-trimethyl-4-nonyloxypolyethyleneoxyethnaol, water, polyethylene glycol, and 2,6,8-trimethyl4-nonanol.

* * * * *